July 26, 1960

J. E. HAWKINS 2,946,393

METHOD OF SEISMIC PROSPECTING

Filed June 19, 1953

INVENTOR.
James E. Hawkins
BY
Mason Kolehmainen Rathburn & Wyss.
Attys.

July 26, 1960  J. E. HAWKINS  2,946,393
METHOD OF SEISMIC PROSPECTING
Filed June 19, 1953  5 Sheets-Sheet 2

INVENTOR.
James E. Hawkins
BY
Mason Kolehmainen Rathburn & Wyss.
Attys.

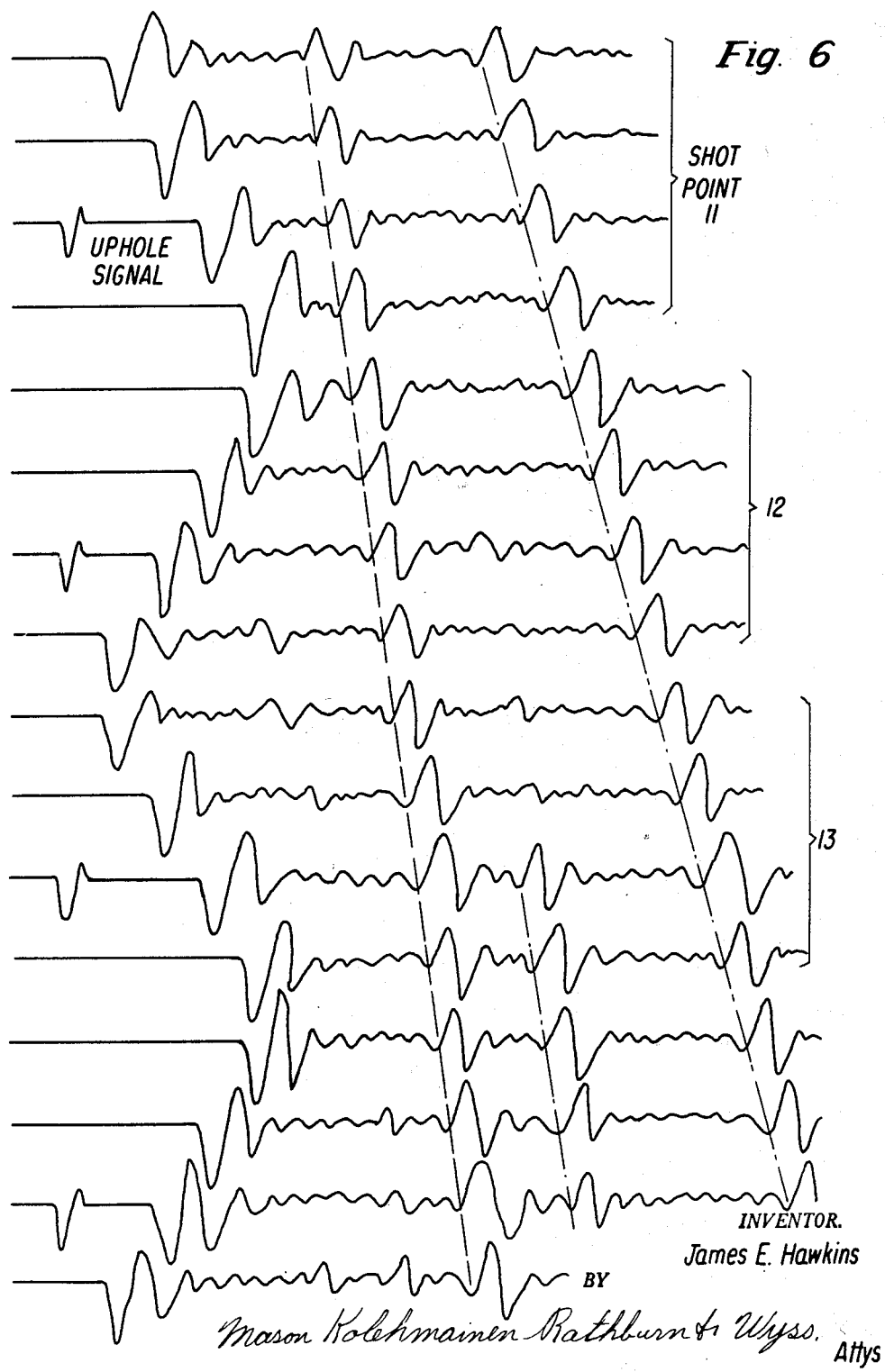

United States Patent Office 2,946,393
Patented July 26, 1960

2,946,393
METHOD OF SEISMIC PROSPECTING

James E. Hawkins, Broken Arrow, Okla., assignor to Seismograph Service Corporation, Tulsa, Okla., a corporation of Oklahoma Filed June 19, 1953, Ser. No. 362,766

5 Claims. (Cl. 181—.5)

The present invention relates generally to a method of seismic prospecting and, more particularly, to an improved method of recording and reproducing a plurality of seismic waves obtained during a seismic prospecting survey.

Geophysical explorations of the general character of the present invention have been used in locating and examining subterranean strata by producing wave energy which travels through underground formations and is refracted thereby or is reflected by the subsurface strata under investigation. In conducting geophysical surveys of this nature, provision is generally made for transmitting waves from a source, as by the detonation of explosives or the generation of other elastic waves, which are directed to the subsurface strata and are reflected back to a plurality of spaced receptors located at the earth's surface. By measuring the time interval between the initial propagation of the wave and the arrival at each of the receptors, information is available for making a definite determination of the configuration and location of the subsurface formations. It is apparent, however, that the arrival of the propagated waves from the source at each of the receptor points will vary in accordance with the horizontal spacing of each of the receivers from the transmitting source, the interval between the arrival of waves at any two receptors being termed the "step out" or "spread effect" of the detector array. The general practice in conducting such surveys is to make what is commonly called a spread correction during interpretation of the records.

Proper interpretation of the records usually obtained is also difficult due to the topographic irregularities of the earth's surface which cause differences in elevation between the propagating source and the individual detecting points. Accordingly, waves arriving at the various receiving positions are displaced by an interval corresponding to these elevation differences and, unless correction is made for these irregularities, it is difficult properly to interpret the seismic information. Proper analysis is also inhibited by local conditions appearing near the earth's surface at the receiving points and at the source which have been termed "weathering irregularities" and which introduce variations in the individual waves received due to the differences in velocity of the propagated waves through different earth formations. The general prior practice has been to correct for the elevation and weathering differences during interpretation of the records. It is apparent that the prior practice for correcting weathering, elevation and spread effect is both laborious and time-consuming since it involves analysis of each record to determine the proper correction for each individual trace and a correction of each individual trace in accordance with the analyzed information.

It is therefore, an object of the present invention to provide an improved method of seismic prospecting for an area under survey by utilizing a plurality of shot points and detecting arrays in which all of the signals received by the detectors are recorded reproducibly and reduced to a common datum level during reproduction.

Another object of the invention is to provide a method of seismic prospecting in which corrections for variations in the earth's topography and weathering layer may be compensated for as the reproducibly recorded information is reproduced without resorting to a later analysis.

It is a further object of the invention to provide a method of geophysical exploration in which corrections for the spread effect of a plurality of detection points and corrections for elevation differences between these points may be introduced while the survey is in progress.

A still further object of the invention is to provide a method of seismic surveying in which a plurality of reproducible seismic records are obtained for the same area from a plurality of spaced propagating points and in which all of the individual records are corrected to a common datum plane during the reproducing operation and all of the records are combined in "well log" form with the datum points in alignment.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 6 is a graph in well-log form showing a plurality of corrected records which have been reduced to the same datum plane and in which the datum points have been aligned.

Figure 1:
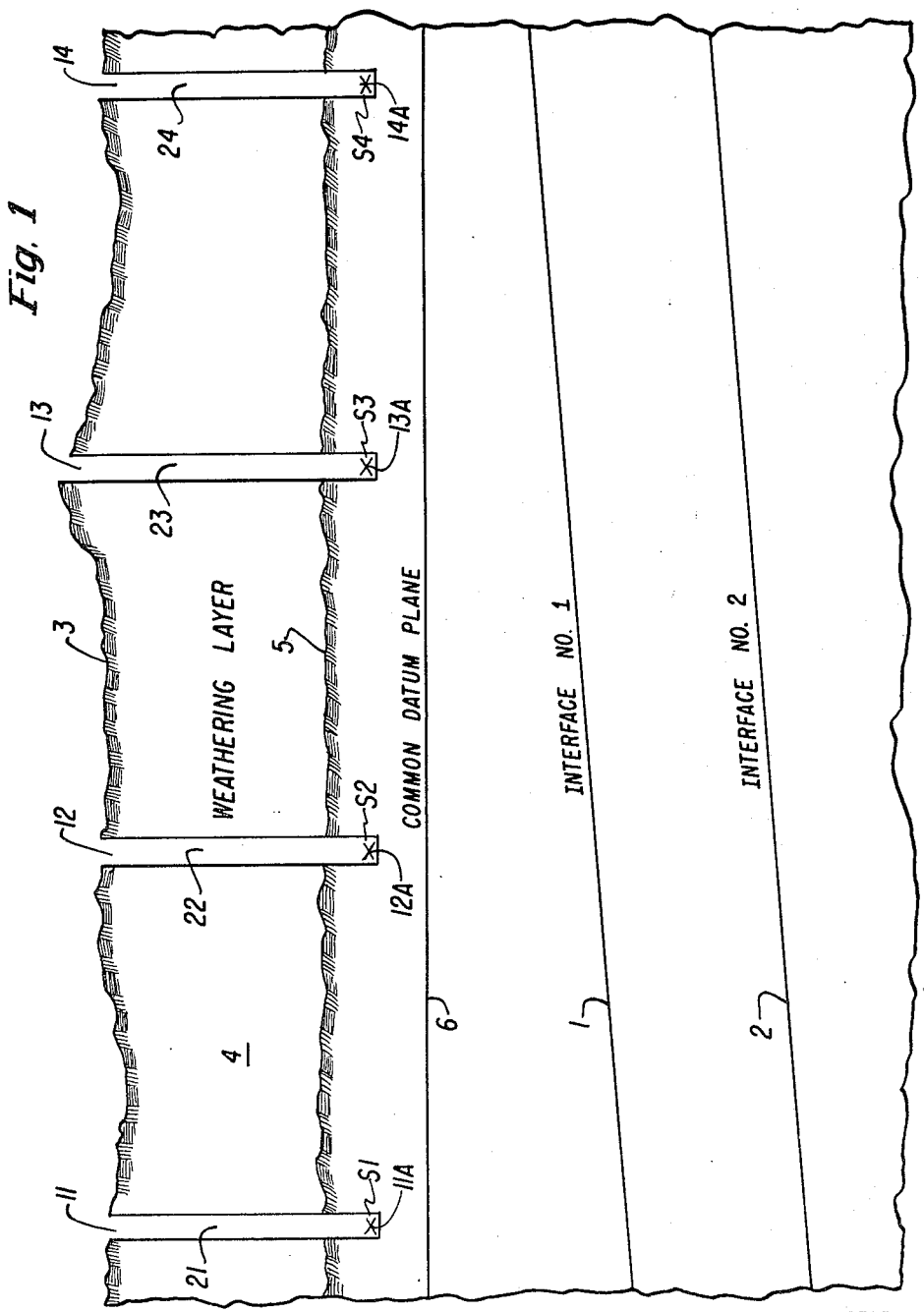
Fig. 1 illustrates the appearance of a subsurface structure that might be encountered in the practice of the present invention and the location of a plurality of bore holes or shot points at which seismic waves may be generated.

Referring now to the drawings and more particularly to Fig. 1 thereof, there is illustrated diagrammatically a section of the earth's crust which might be encountered in practicing the present invention. The particular section shown includes two subsurface interfaces between three subsurface strata, these being interfaces No. 1 and No. 2 indicated by the reference numerals 1 and 2 and which may be located some distance below the surface of the earth which is indicated by the reference character 3. That portion of the earth's crust located directly adjacent the earth's surface is known as the weathering layer, indicated by the reference numeral 4, and extends from the surface 3 of the earth to a varying level boundary layer 5. An imaginary common level or datum plane 6 is also shown which may be preselected to any desired level or elevation above or below the surface of the earth, but is shown for convenience as being located below the weathering layer between the boundary 5 and the interface 1. The depths of the various layers shown and the underground positions of the interfaces 1 and 2 are not intended to be scaled in Fig. 1, but are shown in diagrammatic form for purposes of illustration only.

In accordance with the present invention, the subsurface strata disposed below the surface of the earth are profiled by a method which includes the generation of seismic waves at different shot points horizontally spaced above, on or below the earth's surface. Each of the shot points has associated therewith a plurality of co-linear receptors or detectors which are adapted to receive the reflections and refractions from the subsurface interfaces. Separate phonographically reproducible records are initially made of the seismic signals received at each detector from each of the spaced shot points. During reproduction, these records are all corrected to a common datum plane. The separate records are then arranged in "well-log" form with their datum points in alignment, thereby producing a cross section in which the differences from the common datum plane to the reflecting surface are directly indicated and from which errors due to weathering, elevation and spread effect have been eliminated. The separate records may be reproduced in visual form to aid analysis and interpretation and, if desired, may be mixed to accentuate desired signal energy and attenuate undesired signal energy.

A plurality of spaced shot points at which seismic waves are generated are indicated by the reference numerals 11, 12, 13 and 14 shown in Fig. 1. The shot points are illustrated as being spaced apart bore holes 21, 22, 23 and 24 which extend some distance into the earth and which may be formed and located in the manner customarily followed in seismic prospecting. The seismic waves may be generated in conventional manner; for instance, by the detonation of explosives customarily called shots or by a transmitter of elastic wave energy. For the purposes of the present invention it will be assumed that explosive generation is employed and for that purpose a plurality of shots 11a, 12a, 13a and 14a are positioned within the bore holes 21, 22, 23 and 24, respectively, at any desired distance below the earth's surface or, if desired, these shots may be located directly at the surface of the earth or above the surface of the earth.

Figure 2:
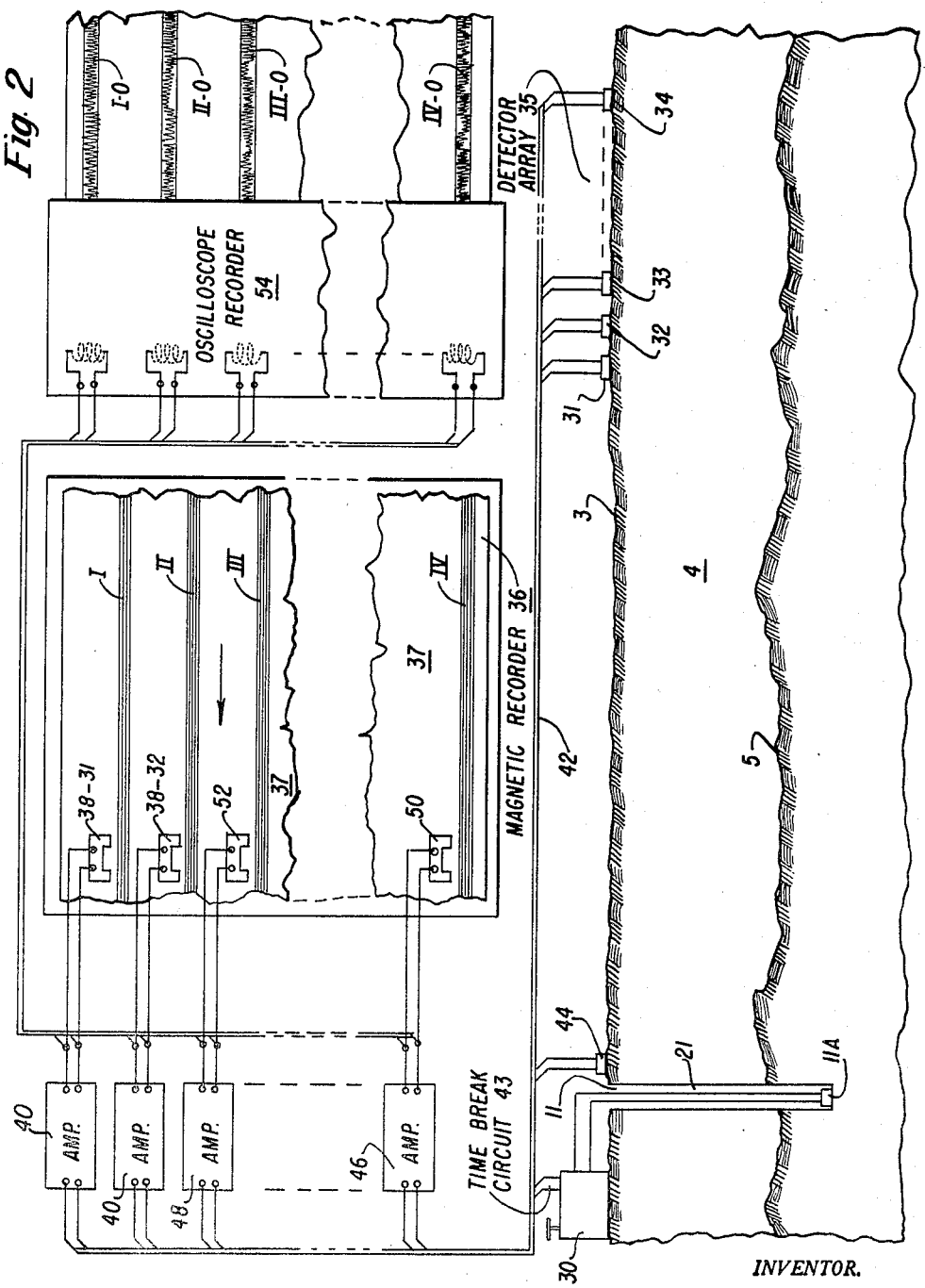
Fig. 2 illustrates apparatus used in the practice of the invention in making recordings of signals received at a plurality of detecting points from a wave generated at a single shot point.

Referring now to Fig. 2 there is shown the single shot point 11 at which the seismic wave energy is generated and a plurality of horizontally spaced detecting means in the form of seismic wave receivers or detectors 31, 32, 33 and 34. These receivers are co-linear with the shot point 11 but are spaced different horizontal distances therefrom. It is to be understood that any number of seismic wave receivers may be associated with each of the shot points and each set of these receivers is termed a detector array, the array for the shot point 11 being represented by the reference character 35. Although the detectors 31, 32, 33 and 34 are shown in Fig. 2 as being approximately aligned horizontally, these receivers are actually positioned on the surface 3 of the earth, the topography of which may vary considerably so that each receiver is located at a different vertical elevation with respect to the common datum plane 6.

The seismic waves may be produced by explosions which are detonated in a conventional manner as by the firing apparatus 30 illustrated in Fig. 2, wherein the apparatus is shown disposed to fire the shot 11a at the shot point 11. The elastic waves produced by the shot 11a travel through the subsurface formations and are detected by the detectors of the array 35, some of the energy received by the detectors being reflected from the interfaces 1 and 2 and other energy arriving at the detectors directly from the shot point through the earth's weathering layer 4. All of the energy arriving at the detectors passes through this weathering layer and undergoes a considerable reduction in velocity as this layer is traversed. Since the wave travel time through the weathering layer 4 is unlikely to be identical at each of the spaced detecting positions 31, 32, 33 and 34, it is desirable to correct for the delay in the wave energy due to this layer. The deterrent effect of the weathering layer on the transmitted energy at the source 11a may be obviated by positioning the shot 11a below the lower boundary 5 of this layer as shown in Fig. 2.

The received energy at the spaced detectors is resolved into individual phonographically reproducible records in which separate record traces are provided for each detection point and separate records are provided for each shot point. The separate record produced for the shot point 11 and the detector array 35 may be produced by suitable recording means and is indicated as being a magnetic tape recorder 36 including a tape 37 of sufficient width and a plurality of transducer means or recording heads 38 spaced transversely of the tape in order to produce a plurality of spaced record traces thereon. The number of recording heads 38 used is equal to the number of separate detectors in the detector array 35 and each of the heads is connected through an associated amplifier 40 and by means of conductors contained within a cable 42 to a predetermined one of the seismic wave receivers. For example, the uppermost head 38 is connected to the geophone 31, the second head is connected to the geophone 32, the third head to the geophone 33 and so on, as indicated by the corresponding suffixes added to the numerals 38 representing the transversely spaced recording heads. More specifically, the head 38—31 produces a trace I which records all of the detected signals from the geophone 31, the head 38—32 produces a trace II for recording all of the signals detected by the geophone 32, and similarly each of the other recording heads produces a parallel trace for the other detectors in the detector array.

In the recording operation, the tape 37 is moved at a desired constant speed and records are produced for each detection point or geophone location and for each of the shots fired at the shot point in the event that more than one shot is positioned within the bore hole at said shot point. It may be desired to position a plurality of vertically spaced shots at each of the shot points, the separate shots being located at different elevations in the shot hole and being fired in predetermined sequence. In such case the records resulting from the signals detected at the different detection points are positioned transversely of the recording tape 37 while those resulting from the different shots in the same shot hole may be spaced longitudinally of the tape in the manner disclosed in the application of Emil J. P. Van der Linden Serial No. 362,922, now abandoned, filed concurrently herewith and assigned to the same assignee as the present application.

In order to record the instant of detonation of the shot 11A and to provide a means for correcting for the elevation spacing between the spaced shots at a single shot point in a manner to be subsequently described, the record is provided with indications of the firing of the shot and of the uphole travel time of the wave energy. The indications from which the uphole travel time may be ascertained are provided by a time break circuit 43 and an uphole detector 44 which are respectively coupled through the amplifiers 46 and 48 to the recording heads 50 and 52 of the tape recorder 36. The recording head 50 thus records a signal on the trace IV coincident with the detonation of the shot 11a and the recording head 52 records a signal on the trace III when the wave reaches the uphole detector 44 from the shot.

In order to produce a visual record of the seismic signals detected at the spaced detecting points 31, 32, 33 and 34 an oscillographic recorder 54 is effectively connected in parallel with the tape recorder to produce visual traces I–O, II–O, III–O and IV–O which correspond to the four traces of the magnetic recorder.

Figure 3:
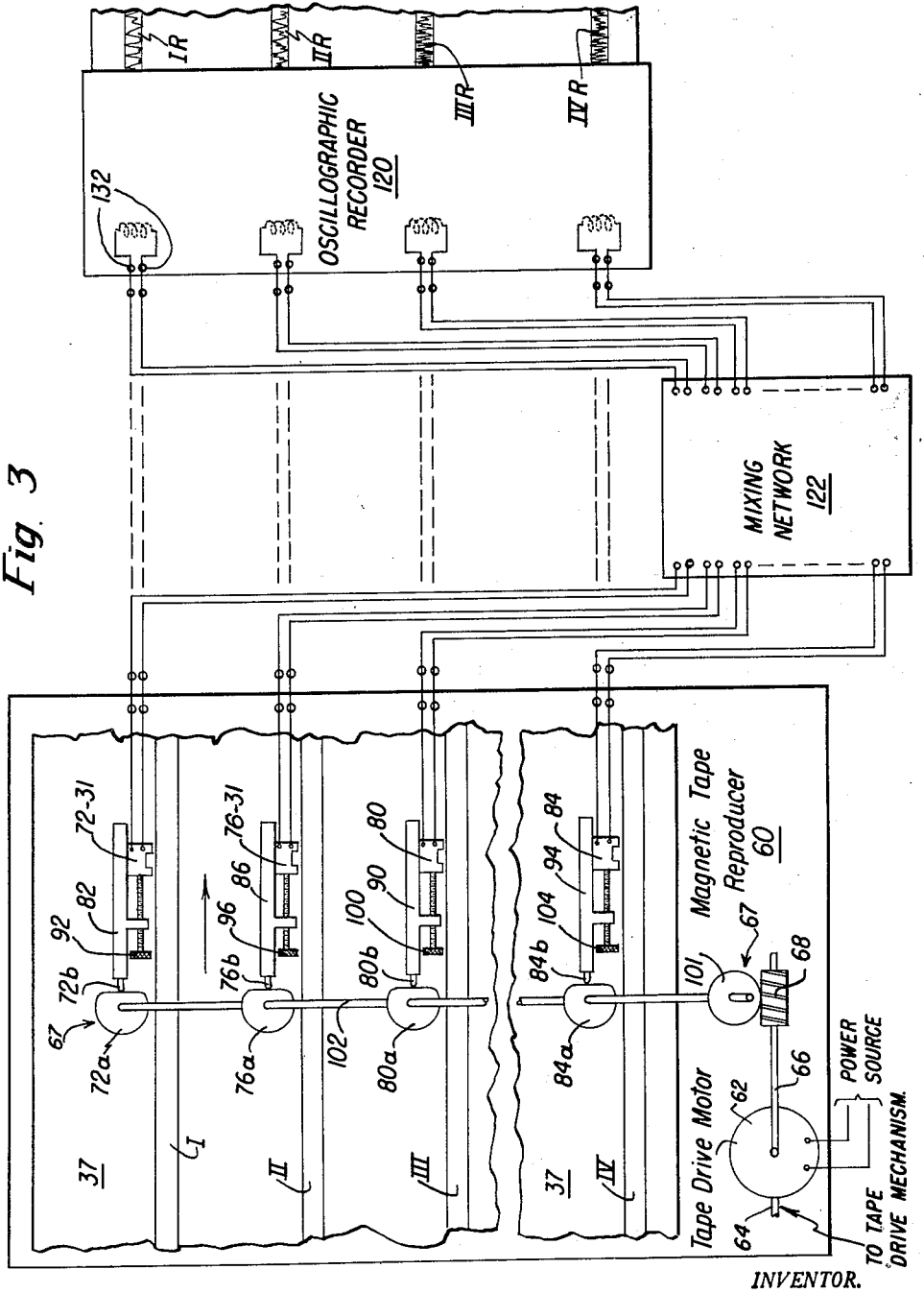
Fig. 3 illustrates apparatus used in the practice of the invention for providing corrections for the elevation differences and weathering conditions of the earth's topography and for providing corrections for the spread effect of the detector array.

Corrections for the weathering layer and detector elevation irregularities may be readily effected during playback of the magnetic tape record in a magnetic tape reproducer 60, illustrated in Fig. 3, to which the record tape 37 is transferred after the magnetic tape recording operation is completed. Briefly, this reproducer includes a tape drive motor 62 mechanically coupled by means of a shaft 64 to a tape drive mechanism which is not shown in the drawings and coupled by means of a shaft 66 to a cam controlled play-back head adjusting means indicated generally by the reference numeral 67.

In order to detect, for visual reproduction and recording, the various recorded signals and to provide for interpretation and analysis of these signals, the recorder 60 is equipped with a number of reproducer or play-back heads. Thus, to detect and reproduce the signals received by the geophone 31 and recorded as trace I on the tape 37 a reproducing head 72—31 is provided. Similarly, to detect and reproduce the signals from the detector 32 recorded on trace II a reproducing head 76—32 is provided which is transversely spaced from the reproducing head for the trace I. The head 80 is provided to detect signals on trace III and thus reproduce the uphole detector signals and the head 84 is employed to detect and reproduce the signals appearing on trace IV. It should be understood, however, that additional traces and play-back heads may be provided, the number used being dependent upon the number of detectors employed in each detector array.

In accordance with the present invention, the weathering and elevation corrections are made and the detected seismic signals are reduced to a common datum plane during playback of the reproducible records on the tape 37 through adjustment of the longitudinal positions of the reproducing heads along the spaced signal traces. These adjustments or corrections are facilitated by mounting the recording heads 72, 76, 80 and 84 on separate movable supports 82, 86, 90 and 84. More specifically, the playback head 72 is slidably mounted on the support 82 in such manner that the reproducing head 72 may be moved longitudinally of the trace I by adjustment of a threaded adjusting screw 92 which is threadedly mounted on the support 82. Similarly, the longitudinal position of the reproducing head 76 along the trace II may be altered by means of an adjusting screw 96 mounted on the movable support 86. The longitudinal position of the play-back head 80 along the trace III may be varied by means of an adjusting screw 100 which is mounted on the movable support 90. The position of the reproducing head 84 with respect to the trace IV is adjustable through manipulation of an adjusting screw 104 mounted on the movable support 94. As previously indicated, the seismic signals recorded along the various traces are reduced to a common datum plane by adjusting the adjusting screws 92, 96, 100, 104, etc., by an amount which is determined either from calculations made on the first play back of the recorded traces or, preferably, from the visual record produced on the oscillographic recorder film simultaneously with the recording of the original reproducible record. Thus, in order to introduce the time delays between reproduction of the seismic signals on the individual traces necessary effectively to reduce the signals to a common datum plane, it is only necessary to adjust the individual adjusting screws 92, 96, 100, 104, etc., until the signals reflected or refracted from a given interface, i.e. the interface No. 1, for example, and detected by the individual detectors 31, 32, 33, 34, etc. are reproduced with a time relationship therebetween as though the shot 11a and the detectors were all located on the common datum plane 6. Thus the signals are reproduced timewise as though the shot point and the geophones had all been located on an artificial plane represented by the datum level 6 of Fig. 1, which plane is below the weathering layer 4 and below the elevation of the lowest individual detector. The reproduction of a record after the signals have thus been reduced to the common datum level results in the production of signals from which the weathering and elevation effects have been eliminated.

As mentioned above it may be desirable to use a plurality of vertically spaced shots within a single bore hole and for such installations correction may also be made for the vertical spacing between the individual shots within the hole by further adjusting the play back heads in the manner disclosed in the application of Emil J. P. Van der Linden, Serial No. 362,922, now abandoned filed concurrently herewith and assigned to the same assignee as the present invention. To provide these corrections, each of the traces has associated therewith a number of reproducing heads which is equal to the number of separate shots at a single shot point and each of the separate heads is adjusted to provide the necessary elevation correction in the manner disclosed in the identified Van der Linden application. It will be apparent to those skilled in the art that the elevation corrections may be provided in the reproducer of the present invention by incorporating the structure disclosed in that application in the recorder and reproducer disclosed in this application.

For purposes of the present invention, however, it will be assumed that the only desired corrections are those required by the weathering layer and by the elevation differences and spread effect of the detectors in each array. After the heads have been adjusted in the above-described manner to correct for the weathering and elevation effects, it is desirable to introduce a spread correction which, in effect, reduces the time difference intervals to those representative of differences in elevation of the reflecting subsurface horizon. More specifically, the purpose of the spread correction is to compensate for the differences in horizontal distance between the shot point and the separate detectors, which correction effectively reduces this horizontal distance to zero and produces corrected signals having the same time differences as would have been obtained had the geophones been located directly above the shot point. This is a hypothetical condition, but such a correction eliminates the slant travel time of the reflected wave energy and thus the corrected time signals indicate directly the travel of the wave normal to the reflecting horizon and back. The spread correction to be introduced is a function of the velocity of the seismic wave energy, the horizontal distance from the shot point to the detectors and the depth of the reflecting horizon as represented by the time of travel to the reflecting horizon. To introduce the spread effect correction, each of the reproducer heads for the separate traces produced by the geophones is moved longitudinally of the trace by an amount which will compensate for the differences in travel time of the reflected waves to the individual detectors in each array. The differences in velocity which affect the spread correction are corrected by means of the cam adjusting play-back mechanism 67. The mechanism 67 includes a plurality of spaced cams 72a, 76a, 80a, 84a, etc., which are mounted on a common, driven cam shaft 102. To impart the rotation of the tape drive motor 62 to the cam shaft 102 a worm 68 is provided which is mounted on the coupling shaft 66 of the tape drive motor and meshes with a worm wheel 101 mounted on the cam shaft. Each of the cams 72a, 76a, 80a, 84a, etc., is of a shape which is a function of the velocity of the wave propagation in the earth formation being explored. The rotation of the cam shaft 102 occurs simultaneously with the movement of the magnetic tape 37 since tape drive motor 62 serves as a common drive means for rotating the tape drive mechanism and the cam shaft. Rotation of the cam shaft induces movement of the cam followers 72b, 76b, 80b, 84b, etc., which are mounted on the supports for the individual reproducing heads and, consequently, rotation of the cams causes longitudinal movement of each of the recording heads along the traces by an amount which is dependent upon the shape of the cams and the amount of rotation thereof, The amount of rotation of each cam and therefore the ultimate movement of each of the reproducer heads is therefore a function of the period of time in which the reproducer heads are reproducing signals from the records.

Since the velocity of the wave energy through the earth remains substantially constant throughout a particular area under survey, a set of cams may be installed having a shape corresponding to that velocity gradient which will suffice for all seismic readings taken in that particular area, providing the same spread distance and the same detector spacing is used for all set-ups used in the area. In this regard, it will be understood that the spread correction and the amount of the time step-out between the successive detectors of a detector array vary as a function of the distance between the detector array and the shot point. The spread correction also varies as a function of the distance between the detectors of an array. Thus, if either the spread distance or the detector spacing distance is changed, a new set of cams having configurations conforming to the changed distance must be used even though the velocity of travel of the wave energy through the earth remains the same.

To compensate for the different earth formations which would be encountered in various geographical areas which might be encountered in other surveys and to provide a correction for the different velocities of wave propagation through these formations the cams may be replaced by a new set of cams having camming surface configurations corresponding to the particular velocities encountered. However, since the velocity of propagation remains approximately constant over an extensive area, the cam sets will seldom have to be replaced in making a particular survey, providing the spread distance and the detector spacing distance are held constant for all set ups used in the area.

After the corrections for weathering and elevation have been introduced by moving the reproducer heads to induce relative time displacement between the signals derived from the respective traces and after further displacing the reproducer heads a given amount to correct for velocity and record time, the resultant signals are representive of those which would have been obtained if the shot had been located on the datum plane and the geophones had been superimposed upon the shot point. By utilizing the same procedure with respect to each of the shot points 11, 12, 13 and 14 in the area under survey, all of the separate records may be reduced to this common level and the reproduced records may be placed in "well log" form to produce a cross section on which the differences in time are directly indicative of the differences in depths from the datum to the subsurface strata, all in the manner explained below. All of the variations which normally confuse the seismic records are eliminated so that only the elevation changes of the reflecting horizons are indicated.

After reproduction by the reproducer 60 in the manner just explained, the signals may either be directly recorded by the oscillographic recorder 120 or mixed in the mixing network 122 and then recorded by the oscillographic recorder 120. To this end the output terminals of the reproducer heads are connected through separate pairs of conductors to the input terminals of the mixing network where these signals are combined in pairs and applied to the input terminals 132 of the oscillographic recorder. In this manner the signals detected by the geophone 31 and appearing on trace I are applied to the oscillographic recorder to produce an output trace I-R. The other reproducing heads are similarly connected to the mixing network and recorded to produce the resultant traces II-R, III-R and IV-R. Mixing of the signals in the network 122 following reproduction thereof facilitates the interpretation and analysis of the composite record since all reflection signals mixed are additively combined due to the fact that these signals have ben reduced to a common level and are substantially in phase. Out of phase random noise signals tend to cancel during the mixing process and thus accentuate the reflection signals on the final oscillographic record produced by the recorder 120.

Figure 4:
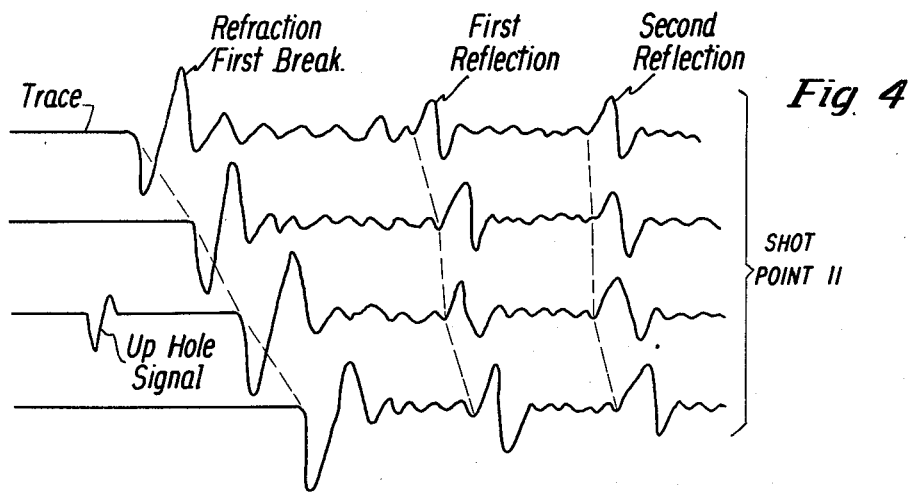
Fig. 4 is a graph showing visually reproduced records obtained at the detector array from a single shot point before adjustment has been made for the weathering, elevation and spread effects.
Figure 5:
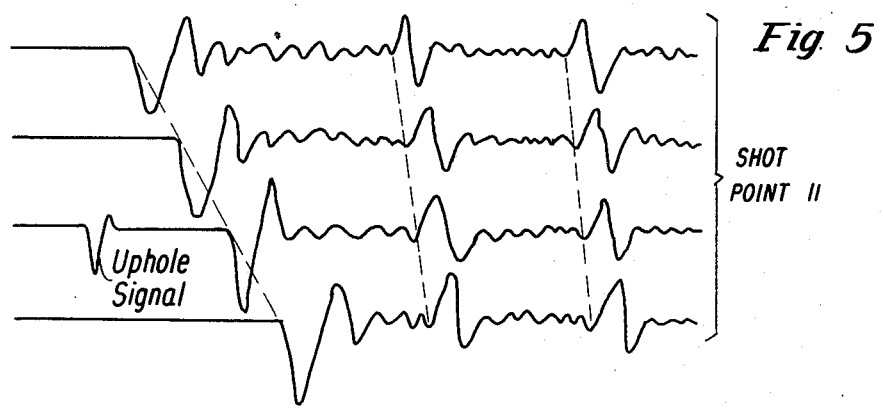
Fig. 5 shows a graph of the visually reproduced record of Fig. 4 after the traces have been longitudinally adjusted to correct for the aforementioned variations.

Referring now to Fig. 4, the signal traces on the idealized record there shown are indicative of the signals received by the detector array 35 from the shot point 11 and are shown in their respective positions before corrections have been made for the weathering, elevation and spread effects. It can be seen that the errors introduced cause the reflections from the two subsurface strata to appear at points in the individual traces which are not in alignment. After the correction factors have been introduced in the manner explained above, the traces from the shot point 11 will appear on the final record as shown in Fig. 5 in which all of the reflection signals are effectively aligned timewise. By combining the separate corrected final records from the shot points 11, 12, 13 and 14 a composite record in well log form is produced as shown in Fig. 6 in which the tilt from the vertical of the aligned reflected waves is a function of the tilt of the reflecting subsurface horizon, thereby assisting in the interpretation analysis. To combine the separate final records into well-log form, it is only necessary to arrange the records successively obtained from successive detector array locations, one below the other, so that the uphole detector signal pulses are in vertical alignment. When thus arranged, the differences in the distances of the first reflection pulses, for example, from the vertical line passing through the leading edges of the recorded uphole detector pulses is representative of the differences in elevation of the first reflecting horizon or interface No. 1 at the different detector location points along the line of survey.

From the foregoing detailed description it will be apparent to those skilled in the art that the method of the present invention may be practiced by locating the various shot points at positions as shown in Fig. 1 either with a single shot per hole or a plurality of vertically spaced shots at each of the shot points. The magnetic tape recorder 36 and the oscillographic recorder 54 are placed in operation before each shot is fired. As a result, the waves detected by the detectors are recorded as traces on the magnetizable medium. The oscillographic records provide a visual means for ascertaining the weathering correction and available topographic survey data is used to ascertain the correction for elevational difference between the detectors. These steps are repeated for each detector array setting and each shot fired.

Each magnetic record from the recorder is then placed in the reproducer 60 illustrated in Fig. 3 and the heads 72, 76, 80, 84, etc., are adjusted to introduce the weathering and elevation corrections as determined in the manner explained above. The recording heads are further adjusted to introduce a correction for the horizontal distance between receivers in the array and a cam assembly is selected and assembled which corresponds to the spread distance and detector spacing distance used in producing the record as well as the velocity of propagation of waves in the earth formations under analysis. As the tape is driven to reproduce the recorded signals, the cam surfaces introduce their corrections and the transversely spaced reproducer heads supply the reproduced signals to the second oscillographic recorder 120 with or without mixing as desired. After the final records are thus obtained they are combined in well log form in the manner explained above to facilitate interpretation thereof.

From the foregoing it becomes apparent that the present invention provides a novel and easily practiced method for effecting seismic prospecting by reducing a plurality of separate records containing information concerning the areas under survey to a common level, thereby eliminating inherent errors in prior seismic surveying methods.

It is to be understood that the foregoing description is pertinent only to one embodiment of the invention to illustrate the principles thereof. Obviously many modifications and variations of this invention are possible in the light of the above teachings. It is intended by the appended claims to cover all modifications and variations which fall within the true spirit and scope of the invention as defined in the appended claims.

What is claimed as new and desired to be secured by Letters Patent of the United States is:

1. The method of seismic prospecting to produce a visual profile of subsurface earth formations which comprises profiling subsurface strata disposed below the earth's weathering layer by generating seismic waves in the earth at different shot points over said strata, producing at a plurality of spaced detecting points with means including geophones, individual phonographically reproducible records of the uphole signal and the seismic wave reflections from at least one subsurface interface to said detecting points, each of said records including a plurality of signal traces each corresponding to the seismic wave reflections and refractions arriving at one of said geophones and each record also including an indication representative of a time indexing signal from each of said shot points, separately reproducing said records by reproducing means associated with each of the signal traces of each individual record, translating the reproduced signals into visual records, displacing the reproducing means associated with each of said phonographically reproducible records with respect to each other on a per trace basis during reproduction of said reproducible records in order to compensate for the horizontal spread of the detecting points and for other factors creating undesired time differences between signals appearing on the traces and reflected from the subsurface strata, relatively displacing all of the reproducing means and their associated reproducible record during the reproduction of each of said reproducible records in order to compensate for the effect of those factors causing undesired time differences between the signals on said records reflected from said strata and at the same time introducing a time correction of an amount sufficient to reduce all of the traces on all of the records to a common datum plane, and arranging all of the visual records produced after displacement of the reproducing means in side-by-side relationship for visual inspection and analysis merely by aligning the time indexing signals of all of said records so that the signals corresponding to the reflections from said one interface automatically fall into alignment on said side by side records in accordance with the contour and disposition of said one interface.

2. The method of seismic prospecting to produce a visual profile of subsurface earth formations which comprises profiling subsurface strata disposed below the earth's weathering layer by generating seismic waves in the earth at different shot points over said strata, producing at a plurality of spaced detecting points with means including geophones, individual phonographically reproducible records of the seismic wave reflections from at least one subsurface interface to said detecting points with each record containing a plurality of traces respectively representative of energy received at the different detecting points and with at least one trace on each record also including a time reference signal, separately reproducing the records and translating the reproduced signals into visual type traces respectively corresponding to the traces on the phonographically reproducible records, correcting the signals reproduced from all of the traces on each reproducible record to compensate for record to record time differences and to reduce all of said signals to a common datum plane during the reproduction of the records, correcting the signals from each trace of each reproducible record to compensate for trace to trace time differences, thereby to bring all of the visual traces corresponding to the traces from all of the records to said common datum plane, and arranging said visual traces in side by side relationship for visual inspection and analysis by merely aligning the time reference signals so that the signals corresponding to the reflections from said one subsurface interface automatically fall into alignment on said side by side visual traces in accordance with the contour and disposition of said one interface.

3. The method of claim 2 wherein the time corrections are effective to reduce all of the visual traces to a common datum plane located below the earth's weathering layer.

4. The method of claim 2 wherein said time reference signal is an uphole signal recorded from each of the shot points and wherein the visual records are oriented in side by side relationship merely by aligning the uphole signals of the several records.

5. The method of claim 2 wherein the step of producing the individual phonographically reproducible records is effected by storing energy arriving at said detecting points upon a magnetizable and reproducible medium.

References Cited in the file of this patent

UNITED STATES PATENTS

| | | |
|---|---|---|
| 2,154,548 | Wheatherby | Apr. 18, 1939 |
| 2,231,575 | Gardner | Feb. 11, 1941 |
| 2,243,730 | Ellis | May 27, 1941 |
| 2,317,334 | Shimek | Apr. 20, 1943 |
| 2,440,971 | Palmer | May 4, 1948 |
| 2,539,220 | Athy et al. | Jan. 23, 1951 |
| 2,555,806 | Mitchell | June 5, 1951 |
| 2,620,890 | Lee et al. | Dec. 9, 1952 |
| 2,658,579 | Rieber | Nov. 10, 1953 |
| 2,732,906 | Mayne | Jan. 31, 1956 |
| 2,795,287 | Sharpe | June 11, 1957 |

OTHER REFERENCES

Prescott: "Seismic Record Sections," Geophysics Magazine, vol. 16, No. 4, October 1951, pages 613–625.

Dix: "Seismic Prospecting for Oil," Harper Bros., New York, 1952, pages 73–76.